Patented Mar. 18, 1930

1,750,725

UNITED STATES PATENT OFFICE

CARLTON E. MILLER, OF SAN FRANCISCO, CALIFORNIA

METHOD OF TREATING AMPHIBOLE OF THE ASBESTOS VARIETY

No Drawing. Application filed January 31, 1927, Serial No. 165,048. Renewed January 31, 1930.

My invention, while relating in general to the treatment of amphibole has particular reference to the treatment or preparation of amphibole of the asbestos variety so that this material may be used for new purposes.

As heretofore practiced amphibole asbestos, which I will call it for convenience, has usually been ground in a burr mill, emery mill, roll mill, ball mill, or the like, the resulting product being a dense powder weighing considerable per cubic foot and in which form it is used as a fireproofing medium for paints and as a filler for rubber, etc. Owing to the grinding treatment and its resultant heavy powderlike properties, the material has had a more or less limited use, compared to the wide range of use that its natural physical characteristics would seem to lend it. That is to say it contains fireproofing properties as one salient characteristic, insulating properties as another feature and still other desirable qualities which could be used to advantage, providing a treatment other than that heretofore known was used, to prepare the material.

As a result of extensive experiments and in actual use I have discovered that I can separate, so to speak, the minute fibres of which this material is composed and derive a very fluffy and light flocculent material, preferably in the form of felted pellets as compared to the heavy powder derived from grinding. The preparation of the material to realize this separation of the fibres and a fluffy light flocculent material enables this amphibole asbestos to be used for many new purposes. For instance, owing to the great number of air voids, I have found it to be very efficient as a non-conductor and consequently it has proven very efficient as an insulation for both heat and cold.

Powdered products that are on the market for this purpose have a tendency to settle when in use any length of time. I find that my prepared material does not settle and furthermore, it is highly fireproof. It also resists the action of acid. It can be used to much better advantage than other known preparations as a filling agent between walls that are to be insulated.

The fluffy fluocculent like properties of my prepared material makes the material an improved filtration medium for the filtration of sugar and the like. In this respect it may be used for the same purpose as the so called "Filtercel" material. As still another use it may be molded into blocklike form and pipe covering form, by using any well-known binder in suitable proportion.

These and many other new uses have never before been possible with amphibole asbestos due to the resultant unsatisfactory heavy powder derived from the heretofore only known method of handling and I contend that I am the first to discover that this material can be reduced to a fluffy and light flocculent material preferably in the form of felted pellets of various sizes.

As a method of treating or preparing the amphibole asbestos to derive the best results I prefer to crush or fluff the same in a fast revolving hammer mill, running at a speed of about 3000 R. P. M. It should be clearly understood that this is not a grinding action as the hammers strike the material while suspended in the air and in this way completely separate the minute fibres of which this material is composed, the result being as above stated, a very fluffy and light flocculent material in the form of felted pellets. It is possible that the material leaving the mill contains a negative electrical charge, which has a tendency to separate the fibres making them adhere in crossed relation to one another, thereby producing the pellets referred to. I have found the weight of the material after being prepared in this manner to be ten and one-half pounds (10½) per cubic foot which is ever so much lighter than the same material after grinding or otherwise prepared as heretofore practiced.

Large deposits of the amphibole asbestos may be found in most countries and heretofore it has been recovered only in limited quanties due to its restricted use since the powder derived by grinding was unsuitable except in special cases where weight etc. was not an important factor. The new uses which my method makes possible opens up output channels which will increase the demand and at the same time make it possible to improve the construction of the products which are made as an outcome of the new preparing method.

Broadly, my improved method of deriving this fluffy and light flocculent material from amphibole asbestos consists in separating the fibres by impact as compared to the old unsatisfactory method of grinding where the fibres are cut across the grain leaving a close packing powder. I am aware that short fibre asbestos is hammered and screened to liberate any adhering rock particles and reduce it to fine sizes and further classified by screening according to the length of the fibre, but in my treatment of amphibole, there are no rock particles to contend with; screening, for this reason, or screening to classify according to the length of the fibre, is unnecessary. In my treatment of amphibole the fibre is beaten into distinct, independent felted pellets.

I might add that a microscopic examination of the material shows the separated fibres crossing one another which results in the formation of pellets with the degree of separation determining the size of the pellets and consequently the coarseness of the material.

This application is in part a continuation of my application filed April 10, 1924, Serial No. 705,620 for method of treating amphibole of the asbestos variety and material derived therefrom.

I claim:

1. The herein described method of producing a floculent mass from amphibole asbestos, which consists in separating the closely matted parallel fibres of the amphibole, and beating the same in a hammer mill until they become distinct and independent felted pellets.

2. The herein described method of producing a flocculent mass from amphibole asbestos, which consists in separating the closely matted parallel fibers of the amphibole by impact, and beating the same in a hammer mill until they become distinct and independent felted pellets.

3. The herein described method of producing a flocculent mass from amphibole asbestos, which consists in separating the closely matted parallel fibres of the amphibole, and beating the same while in suspension until they become distinct and independent felted pellets.

4. The process of treating amphibole asbestos which consists in beating the same thereby to separate the closely matted fibres of the amphibole, and continuing beating the same in a hammer mill until the fibers are felted into distinct and independent flocculent pellets.

CARLTON E. MILLER.